United States Patent
Li

(10) Patent No.: US 8,040,983 B2
(45) Date of Patent: Oct. 18, 2011

(54) DEVICE, SYSTEM AND METHOD OF MITIGATING INTERFERENCE IN A WIRELESS NETWORK

(75) Inventor: Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1050 days.

(21) Appl. No.: 11/865,737

(22) Filed: Oct. 2, 2007

(65) Prior Publication Data

US 2009/0086843 A1    Apr. 2, 2009

(51) Int. Cl.
*H03D 1/04*    (2006.01)
(52) U.S. Cl. ........ 375/346; 375/284; 375/285; 375/278; 375/348; 375/254; 375/260; 375/267; 375/296; 375/347; 375/349
(58) Field of Classification Search ................. 375/346, 375/284, 285, 278, 348, 254, 260, 267, 296, 375/347, 349
See application file for complete search history.

(56) References Cited

U.S. PATENT DOCUMENTS

| 2007/0047494 | A1* | 3/2007 | Cordone | 370/335 |
| 2008/0144493 | A1* | 6/2008 | Yeh | 370/230 |

OTHER PUBLICATIONS

Wen-Ching Chang et al., "A Novel Prediction Tool for Indoor Wireless LAN under the Microwave Oven Interference", Information Survivability Workshop 2000, pp. 1-4.
Ad Kamerman and Nedim Erkocevic, "Microwave Oven Interference on Wireless LANs Operating in the 2.4GHz ISM Band", PIMRC 1997, pp. 1-11.

* cited by examiner

*Primary Examiner* — Kabir A Timory
(74) *Attorney, Agent, or Firm* — Shiloh et al.

(57) ABSTRACT

System and method of locating an interferer and mitigating its effect for stations of a wireless local area network. Embodiments provide a protocol and mechanism to evaluate the interferer location relative to a wireless link and to take accurate actions to mitigate the interference effect for specific cases. A method includes classifying a location of an interferer relative to a wireless communication device based on a comparison with a clear-channel threshold and a noise-tolerability threshold of the device, categorizing a location of the interferer relative to a wireless link based on a combination of the interference categories for the transmitting and the receiving devices, and mitigating interference in the wireless network according to the categorization. For example, in some cases, mitigating includes adapting a noise-tolerability threshold of the transmitting device to allow transmission.

15 Claims, 3 Drawing Sheets

DEVICE, SYSTEM AND METHOD OF MITIGATING INTERFERENCE IN A WIRELESS NETWORK

BACKGROUND

Some Institute of Electrical and Electronics Engineers (IEEE) 802.11 standards for wireless communication allow communication in Industrial Scientific Medical (ISM) radio frequency bands, for example, for devices in a wireless local area network (WLAN). However, some non-IEEE 802.11 devices operating in an ISM band may cause performance degradation for neighboring IEEE 802.11 devices. These interferers include, for example, a microwave oven, a Bluetooth device, a cordless phone, or the like. The interferers may reduce throughput in the WLAN, may reduce link performance in the WLAN, or may cause a shutdown of a wireless link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
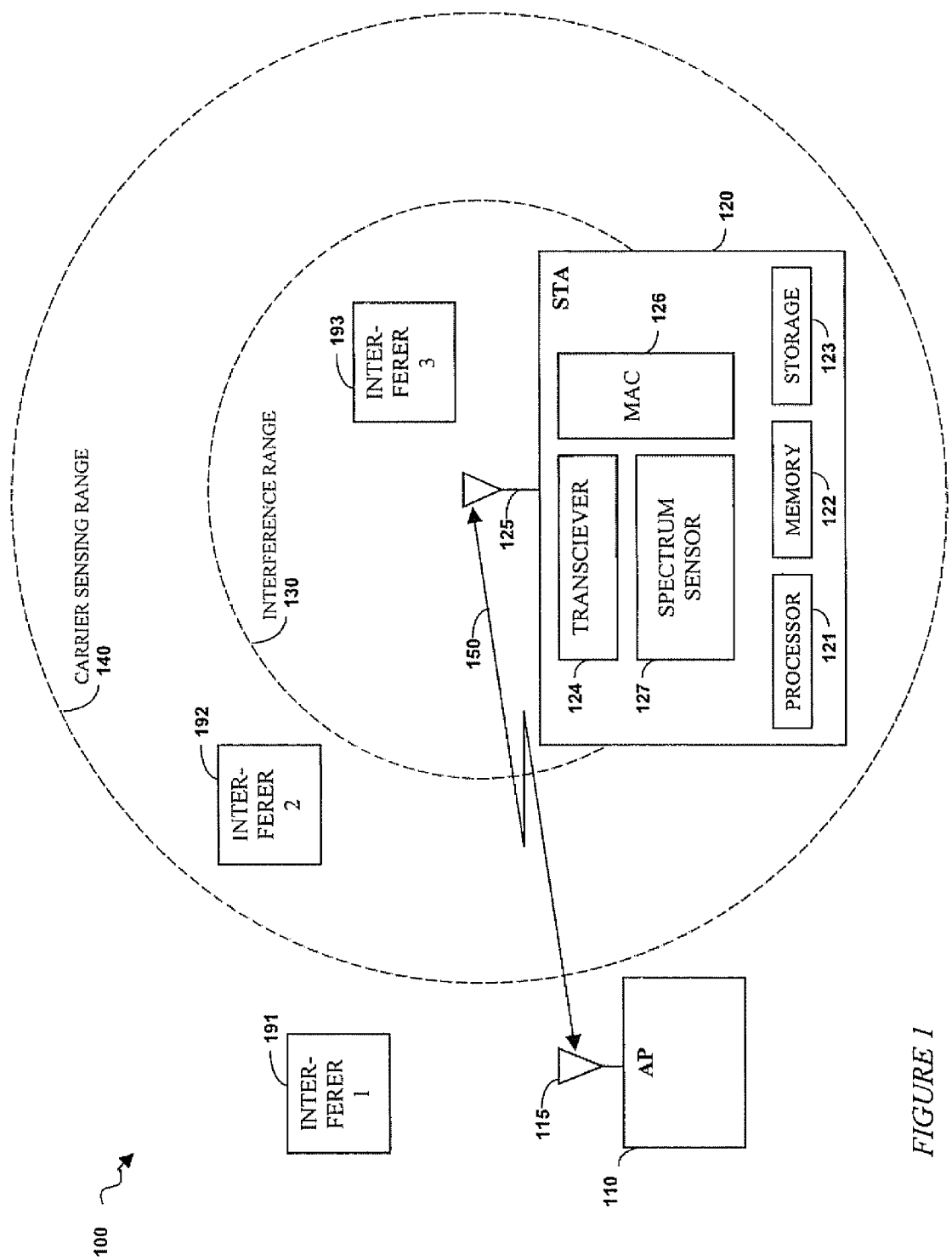
FIG. 1 is a schematic block diagram illustration of a wireless communication system showing possible cases of interferer location relative to a wireless communication device in accordance with a demonstrative embodiment of the invention.

In the following detailed description, numerous specific details are set forth in order to provide a thorough understanding of some embodiments of the invention. However, it will be understood by persons of ordinary skill in the art that embodiments may be practiced without these specific details. In other instances, well-known methods, procedures, components, units and/or circuits have not been described in detail so as not to obscure the discussion.

Some embodiments may be used in conjunction with various devices and systems, for example, a transmitter, a receiver, a transceiver, a transmitter-receiver, a wireless communication station, a wireless communication device, a wireless access point (AP), a modem, a wireless modem, a personal computer, a desktop computer, a mobile computer, a laptop computer, a notebook computer, a tablet computer, a handheld computer, a server computer, a personal digital assistant (PDA) device, a handheld PDA device, a network, a wireless network, a local area network (LAN), a wireless LAN (WLAN), a metropolitan area network (MAN), a wireless MAN (WMAN), wide area network (WAN), wireless WAN (WWAN), a personal area network (PAN), a wireless PAN (WPAN), devices and/or networks operating in accordance with existing Institute of Electrical and Electronics Engineers (IEEE) standards such as IEEE 802.11, 802.11a, 802.11b, 802.11g, 802.11n, 802.11v, 802.16, 802.16d, 802.16e, and other derivatives, long-term evolution (LTE) standards and/or future versions of the above standards, units and/or devices which are part of the above networks, one way and/or two-way radio communication systems, cellular radio-telephone communication systems, a cellular telephone, a cellular smartphone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates a radio frequency identification element or chip, a multiple input multiple output (MIMO) transceiver or device, a single input multiple output (SIMO) transceiver or device, a multiple input single output (MISO) transceiver or device, a multi receiver chain (MRC) transceiver or device, a transceiver or device having "smart antenna" technology or multiple antenna technology, a device having one or more internal antennas and/or external antennas, a wired or wireless handheld device, a wireless application protocol (WAP) device, or the like.

In some embodiments, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. Some embodiments of the invention may be used in conjunction with one or more types of wireless communication signals and/or systems, for example, radio frequency (RF), infra red (IR), frequency-division multiplexing (FDM), orthogonal FDM (OFDM), orthogonal frequency-division multiple access (OFDMA), s-OFDMA, time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, global positioning system (GPS), WiFi, WiMax, ZigBee™, ultra-wideband (UWB), global system for mobile communication (GSM), 2 G, 2.5 G, 3 G, 3.5 G, or the like. Embodiments of the invention may be used in various other devices, systems and/or networks.

Discussions utilizing terms such as, for example, "processing," "computing," "calculating," "determining,". "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. In addition, the terms "plurality" and "a plurality" as used herein include, for example, "multiple" or, "two or more". The terms "plurality" or "a plurality" may be used throughout the specification to describe two or more components, devices, elements, units, parameters, or the like.

The terms "interference" or "noise" as used herein include, for example, random or non-random disturbances, patterned or non-patterned disturbances, unwanted signal characteristics, inter symbol interference (ISI), electric noise, electric interference, white noise, non-white noise, signal distortions, shot noise, thermal noise, flicker noise, "pink" noise, burst noise, avalanche noise, noise or interference produced by components internal to a device attempting to receive a signal, noise or interference produced by co-existing components of a device attempting to receive a signal, noise or interference produced by components or units external to a device attempting to receive a signal, random noise, pseudo-random noise, non-random noise, patterned or non-patterned interference, or the like.

The term "interferer" as used herein includes an interference signal and/or a device that generates an interference signal.

The term "mitigation" (e.g., of interference or noise) as used herein includes, for example, reduction, decrease, lessening, elimination, removal and/or avoidance. Although portions of the discussion herein may relate to mitigation of interference in a context of a WLAN and/or a wireless link, some embodiments of the invention may be used in conjunction with other types of signals. Similarly, although portions of the discussion herein may relate to mitigation of non-WiFi interference, some embodiments of the invention may be used for mitigation of other types of interference or noise.

Some embodiments provide a system, method, protocol and/or mechanism that allows a WLAN device to evaluate how an interferer is located relative to the current WLAN link, and how it interferes with current WLAN link, and how to mitigate the effect of that interference.

FIG. 1 schematically illustrates a wireless communication system 100 in accordance with some demonstrative embodiments of the invention. System 100 may include one or more wireless communication stations (STAs) such as STA 120, as well as one or more wireless access points (APs) such as AP 110. The components of system 100 may communicate network traffic using one or more wireless links, such as link 150, using a shared access medium such as, for example, an ISM radio frequency band. In some embodiments, wireless communication system 100 may include or may be a wireless local area network (WLAN) in accordance with IEEE 802.11 standards.

AP 110 and STA 120 may each be associated with one or more radio frequency antennas, for example, antennas 115 and 125, respectively, to facilitate communication via wireless link 150. Each of antennas 115 and 125 may include or may be, for example, an internal and/or external RF antenna, a dipole antenna, a monopole antenna, an omni-directional antenna, an end-fed antenna, a circularly polarized antenna, a micro-strip antenna, a diversity antenna, or any other type of antenna suitable for transmitting and/or receiving wireless communication signals, blocks, frames, transmission streams, packets, messages and/or data. Optionally, each of antennas 115 and 125 may be implemented using a common antenna, a common set of multiple antennas, or other suitable component(s).

Wireless link 150 may include a downlink and an uplink for carrying traffic between a transmitting device and a receiving device, for example between AP 110 and STA 120. The network traffic carried via link 150 may include packets, frames, or other collections of signals and/or data, such as, for example, media access controller (MAC) protocol data units (MPDUs) and/or physical layer (PHY) protocol data units (PPDUs), that may make up a transmission of wireless signals. The performance level and/or performance degradation of the wireless link may be measured in terms of throughput, for example, in megabits per second (Mbs) of data.

In some embodiments, communication devices that are not a part of the WLAN, for example, a cordless phone, a microwave oven, a Bluetooth device, and the like, may also operate (e.g., using the shared access medium) and may cause interference for components of wireless communication system 100. For example, interferers 191-193 may be non-IEEE 802.11 devices operating in the vicinity of one or more of the wireless links 150 and causing performance degradation in the WLAN. In some cases, for example, packets may be corrupted if an interferer is too close to the receiver, which may lead to numerous retries, backoffs and/or channel wastage. In other cases, the interferer may be close to the transmitter, causing the transmitter to consider the channel as busy whenever the interference is ON, (e.g., when the interferer is operational) even though the interference level may still be tolerable for the receiver. As a result, transmissions may be unnecessarily reduced or deferred, leading to reduced throughput.

In accordance with embodiments of the invention, a wireless communication device such as, for example, WLAN station 120, may be associated with an interference range 130, within which packet reception may be corrupted due to an interferer, and a carrier-sensing range 140, within which energy of an interferer may be sensed. It is assumed that the carrier-sensing range 140 is greater than the interference range 130. For example, interference range 130 may be responsive to an noise-tolerability threshold, denoted "T", and carrier-sensing range 140 may be responsive to a clear-channel threshold, denoted "CCA" where the clear-channel threshold value is less than or equal to the noise-tolerability threshold value. Based on the two sensitivity ranges 130 and 140, there may be multiple (e.g., three) possible cases of how an interferer may be located relative to a WLAN station, for example, as illustrated by the locations of interferers 191-193 relative to STA 120:

In a first case, interferer 191 may be located far away from station 120, such that the energy level of interferer 191 is below the CCA threshold at station 120, and thus station 120 does not sense the interferer 191. In this case, the energy level of interferer 191 is also below the noise-tolerability threshold of station 120.

In a second case, interferer 192 produces a signal having energy greater than the CCA threshold of station 120, and thus the interferer 192 may be sensed by station 120 and the channel may be considered busy when interferer 192 is operational. However, the energy level of interferer 192 is below the noise-tolerability threshold in this case, and thus packets may be successfully received by station 120, if sent, even if interferer 192 is operational.

In a third case, the energy level of interferer 193 is greater than the CCA threshold of station 120 and the interferer signal 193 may thus be sensed by station 120, and the energy level of interferer 193 is also greater than the noise-tolerability threshold of station 120 and the interferer signal 193 may thus corrupt packet reception at station 120.

In some embodiments, the three different interference categories may be encoded using two bits of information. For example, a first bit may be used to signify whether or not the interferer energy level is above the clear-channel threshold, and a second bit may be used to signify whether or not the interferer energy level is above the noise-tolerability threshold, or vice-versa. For example, the representations in the following table, denoted Table 1, may be used, although embodiments are not limited in this respect:

TABLE 1

| CASE # | INTERFERER SIGNAL LEVEL SENSED AT THE STATION | |
| --- | --- | --- |
| | Above CCA? | Above T? |
| Case I | 0 | 0 |
| Case II | 1 | 0 |
| Case III | 1 | 1 |

Station 120 may be or may include, for example, a computing station, a computing device, a computer, a personal computer (PC), a server computer, a client/server system, a mobile computer, a portable computer, a laptop computer, a notebook computer, a tablet computer, a mobile phone, a cellular phone, a handheld device, a network of multiple inter-connected devices, or the like. Station 120 may include, for example, a processor 121, a memory unit 122, and a storage unit 123. Station 120 may optionally include other suitable hardware components and/or software components.

Processor 121 includes, for example, a central processing unit (CPU), a digital signal processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 121 may executes instructions, for example, of an operating system (OS) of station 120 or of one or more applications.

Memory unit 122 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units Storage unit 123 includes, for example, a hard disk drive, a floppy disk drive, a compact disk (CD) drive, a CD-ROM drive, a digital versatile disk (DVD) drive, or other suitable removable or non-removable storage units. Memory unit 122 and/or storage unit 123, for example, may store data processed by station 120.

Station 120 further includes one or more transceivers, for example, a wireless transceiver 124 able to operate in accordance with IEEE 802.11 standards. Transceiver 124 may include a transmitter and/or a receiver, a transmitter-receiver, or other circuitry or sub-units able to transmit and/or receive wireless signals, radio frequency (RF) signals, blocks, frames, transmission streams, packets, messages and/or data, including, for example, components of a MAC 126 and/or a spectrum sensor 127. IEEE 802.11 and/or other suitable wireless communication standards or protocols may be used.

Transceiver 124 may be associated with one or more radio frequency antennas 125 that are operationally coupled with station 120. Transceiver 124 may be co-located with other communication components, for example, using a common housing, packaging, card, circuit, modem unit, wireless network interface card (NIC), or communication unit. In some embodiments, communication components include a media access controller (MAC) 126, a spectrum sensor 127, and any other software and/or hardware elements suitable for operation in accordance with embodiments of the invention.

In some embodiments, MAC 126 may operate in accordance with the IEEE 80211 standards, including, for example, the IEEE 802.11v wireless network management standard. MAC 126 may include mechanisms to control data transfer, including, for example, to transmit and receive frames, to delimit frames, to check for errors, to insert headers with MAC addresses for routing, to route frames according to MAC addresses, and to control timing and/or permissions of transmit queues of data and management flames. In addition, MAC 126 may handle aspects of the transmission flow such as, for example, handshake frames, acknowledgement (ACK) flames, retransmission of frames, and request-to-send (RTS)-clear-to-send (CTS) conversation. MAC 126 may wait for a clear channel indication, for example, reception of a clear channel assessment (CCA) signal from the physical layer, before transmitting. Alternatively, some embodiments of the invention may allow transmitting despite an interferer being sensed on the channel.

In some embodiments, spectrum sensor 127 may be able to sense energy levels of signals in the surrounding spectrum. Spectrum sensor 127 may be implemented, for example at the physical layer (PHY) of the communication unit, or may optionally be combined with MAC 126.

In some embodiments, some or all of the components of station 120 may be enclosed in a common housing or packaging, and may be interconnected or operably associated using one or more wired or wireless links. In other embodiments, components of station 120 may be distributed among multiple or separate sub-units, devices or locations.

AP 110 may be or may include, for example, a wireless AP, a wireless Base Station (BS), a wireless controller, a wireless router; a component of an ad-hoc network operating as an AP or a router; an AP of a Basic Service Set (BSS), a device operating as AP in an Independent BSS (IBSS), an AP or a device able to connect among multiple wireless communication devices, a device able to form a wireless communication network, a device able to relay among wireless communication devices, or the like. AP 110 may include, for example, a processor 111, a memory unit 112, and a storage unit 113. AP 110 further includes communication components able to operate in accordance with IEEE 802.11 standards, for example, one or more wireless transceivers 114, a media access controller (MAC) 116, and a spectrum sensor 117. Transceiver 114 may be associated with one or more radio frequency antennas 115 that are operationally coupled with the AP 110. AP 110 may optionally include other hardware components and/or software components suitable for operation in accordance with embodiments of the invention.

Processor 111, memory 112, storage 113, transceiver 114, antenna 115, MAC 116, and spectrum sensor 117 of AP 110 may include similar components and provide similar functionality as processor 121, memory 122, storage 123, transceiver 124, antenna 125, MAC 126, and spectrum sensor 127 of station 120, respectively. Some or all of the components of AP 110 may be enclosed in a common housing or packaging, and may be interconnected or operably associated using one or more wired or wireless links. In some embodiments, components of station 110 may be distributed among multiple or separate sub-units, devices or locations.

AP 110 may provide additional functionality such as, for example, providing a bridge to wired network infrastructure or arbitrating communication of stations in the WLAN. For example, AP 110 may facilitate communication with a wider network such as, for example, the Internet or an intranet, by either wired or wireless communication. AP 110 may in some embodiments associate wireless devices such as STA 120 with other equipment such as, for example, personal computers, workstations, printers, and the like.

Figure 2:
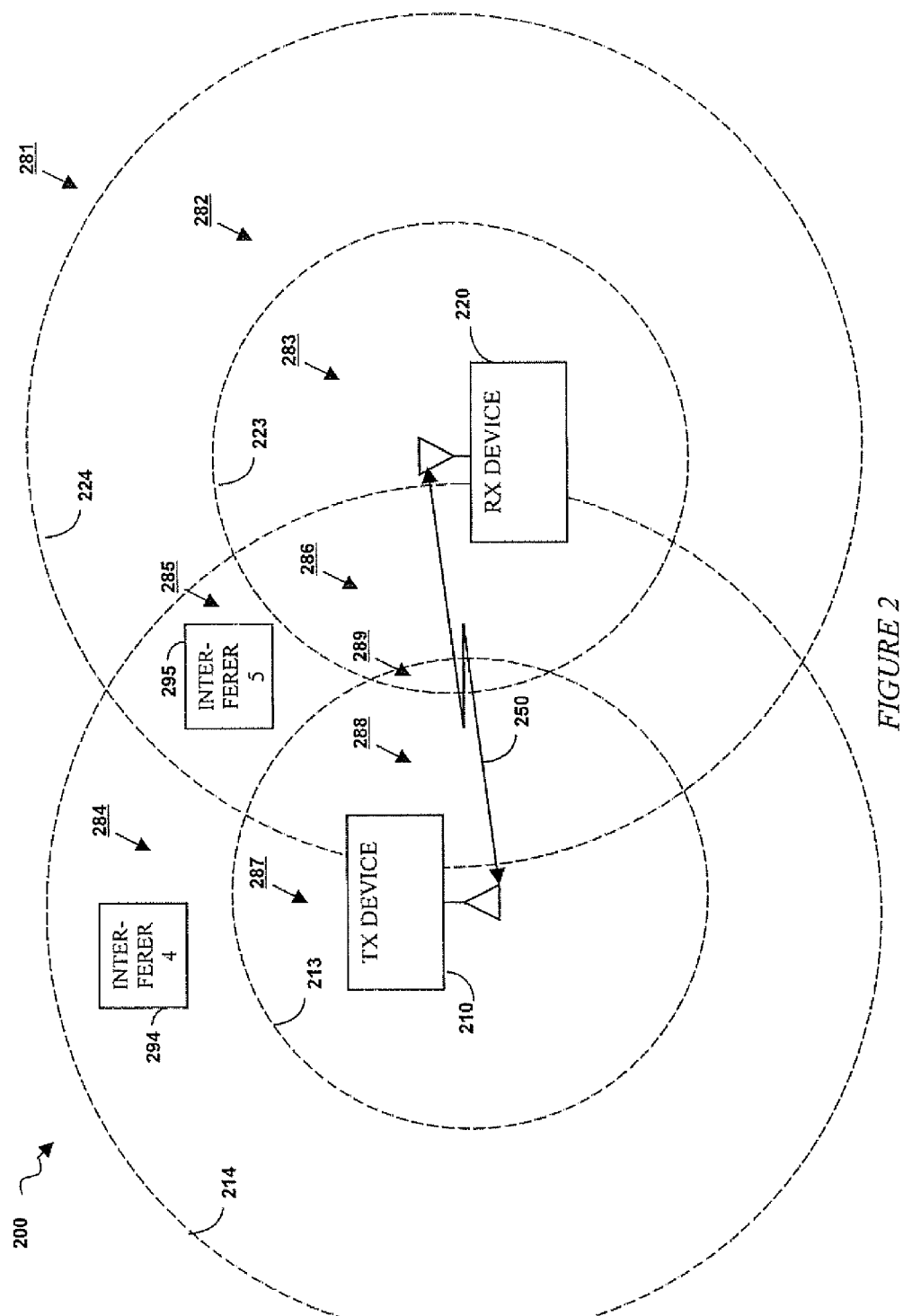
FIG. 2 is a schematic block diagram illustration of a wireless communication system showing possible cases of interferer location relative to a wireless link in accordance with a demonstrative embodiment of the invention.

FIG. 2 schematically illustrates a wireless communication system 200 showing possible cases of interferer location rela tive to a wireless link in accordance with a demonstrative embodiment of the invention. System 200 may include a wireless link 250 for carrying network traffic between a transmitting device 210 and a receiving device 220. Wireless communication system 200 may be analogous to the wireless communication system 100 described with reference to FIG. 1, and may operate in accordance with IEEE 802.11 standard(s).

Wireless communication devices 210 and 220 may be associated with interference ranges 213 and 223, respectively, within which packet reception may be corrupted for the respective device due to an interferer; and also associated with carrier-sensing ranges 214 and 224, respectively, within which energy of an interferer may be sensed by the respective device. It is assumed that the carrier-sensing range 213 is greater than the interference range 214 and that carrier-sensing range 223 is greater than the interference range 224.

Based on the two sensitivity ranges 213 and 214, there may be three possible cases of how an interferer may be located relative to transmitting device 210, Similarly, based on the two sensitivity ranges 223 and 224, there may be three possible cases of how an interferer may be located relative to receiving device 220. For a wireless link such as link 250, a transmitter/receiver may also be a receiver/transmitter, since, for example, the device may need to receive/transmit ACK or other management frames in accordance with IEEE 802.11 standards. Thus, in accordance with embodiments of the invention, may be multiple (e.g., nine) possible cases of how an interferer could be located relative to a wireless link, based on the combination of the possible cases at the transmitter and the receiver. For example, nine possible cases 281-289 of interferer location relative to a WLAN link are schematically illustrated in FIG. 2.

Although embodiments of the invention are not limited in this respect, the following table, denoted Table 2, summarizes possible interference effects for the wireless link 250 in each of the cases 281-289, and what actions may be necessary to mitigate the interference.

TABLE 2

| CASE # | INTERFERENCE LEVEL @ TX | | INTERFERENCE LEVEL @ RX | | INTERFERENCE EFFECT ON LINK | MITIGATING ACTION NEEDED |
|---|---|---|---|---|---|---|
| | Above CCA? | Corrupt packet? | Above CCA? | Corrupt packet? | | |
| 281 | N | N | N | N | None | None |
| 282 | N | N | Y | N | None | None |
| 283 | N | N | Y | Y | Data lost; unnecessary retransmission; unnecessary channel wastage increase | Reduce unnecessary retransmission and channel wastage increase |
| 284 | Y | N | N | N | Unnecessary transmission defer | Reduce unnecessary defer |
| 285 | Y | N | Y | N | Unnecessary transmission defer | Reduce unnecessary defer |
| 286 | Y | N | Y | Y | Necessary transmission defer to avoid data corruption | None |
| 287 | Y | Y | N | N | Necessary transmission defer to avoid ACK corruption | None |
| 288 | Y | Y | Y | N | Necessary transmission defer to avoid ACK corruption | None |
| 289 | Y | Y | Y | Y | Necessary transmission defer to avoid data/ACK corruption | None |

It may be noted that existing IEEE 802.11 MAC protocols work effectively in six of the nine cases summarized (i.e., cases 281, 282, and 285-289). For example, in cases 281 and 282, the receiver may send back ACK confirmation regardless of channel busy/free status if a packet is successfully decoded, in accordance with IEEE 802.11 standards. In cases 285-289, it may be necessary to defer transmission due to interference, in order to avoid corruption of traffic for the transmitter and/or receiver. However, in cases 283-285, some IEEE 802.11 MAC protocols may not operate effectively. Embodiments of the invention described herein provide a method of mitigating interference in cases 284 and/or 285. Other noise mitigating algorithms may be used for case 283.

In case 284 and/or in case 285, even though the interference can be sensed by the transmitter or the receiver or both, the interference is still tolerable. In both cases, the transmitter may behave too conservatively and hold transmission when the interferer signal is ON. However, the packet and ACK can be successfully received if sent. Therefore, increasing the CCA threshold at the transmitter to be above the interferer energy level may help the transmitter to be more aggressive in transmissions and thus reduce unnecessary transmission defer.

For example, interferer 294 (e.g., a microwave device) demonstrates an example of case 284 where only the transmitter can sense the microwave and both sides can tolerate microwave interference. Similarly, interferer 295 (e.g., a microwave device) represents an example of case 285 where both the transmitter and the receiver can sense the microwave energy and both sides can tolerate microwave interference.

Based on the feedback information and evaluation, the transmitter can take corresponding actions. In this particular case, the transmitter may increase its CCA threshold to become mole aggressive and thus mitigates the microwave effect. In some embodiments, for example, by setting the CCA threshold to be above the interference, a 60 to 65 percent throughput improvement may be achieved, which matches the periodicity of the microwave OFF/ON duty cycle.

Figure 3:
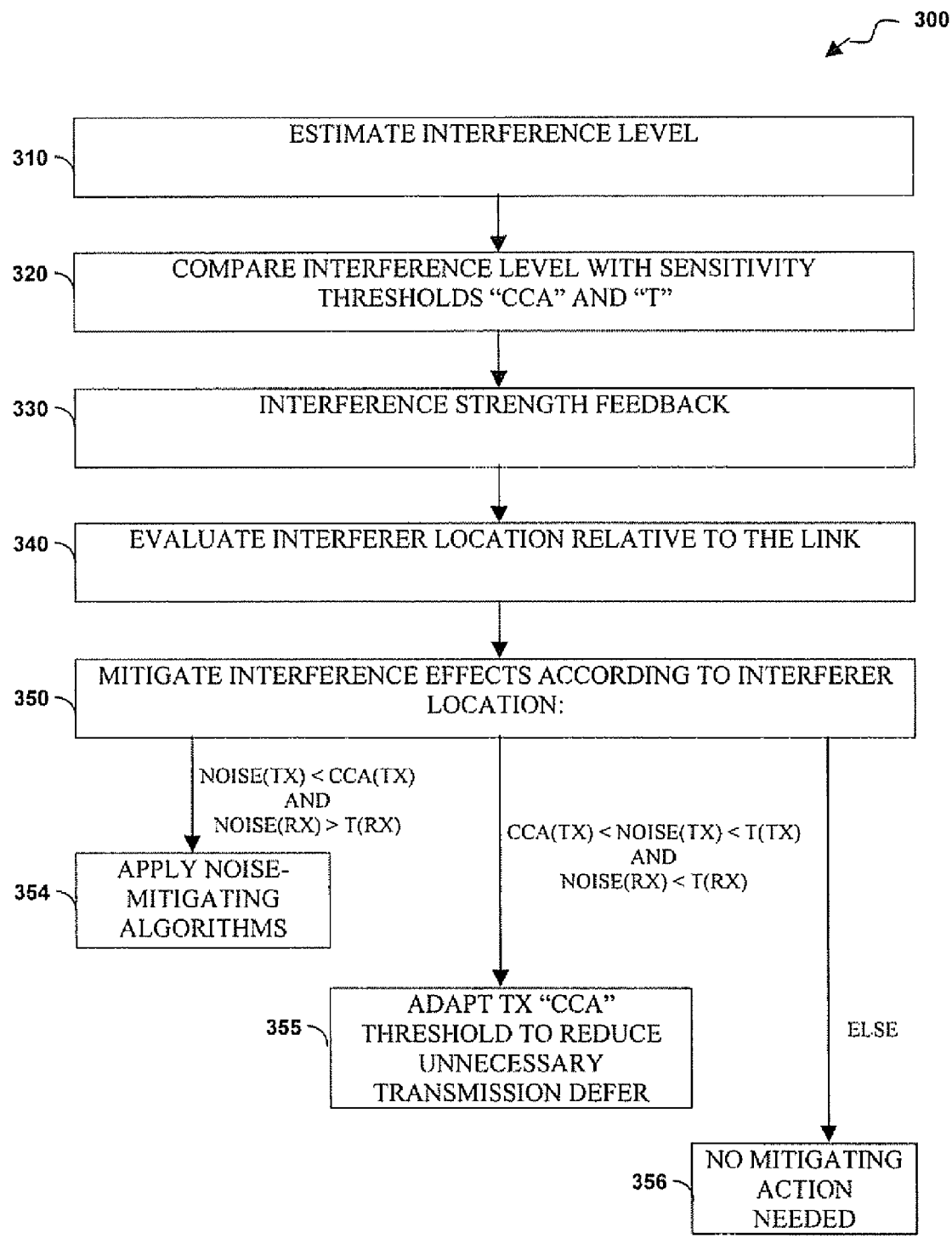
FIG. 3 is a schematic flow-chart of a method of mitigating interference for a wireless communication device in accordance with a demonstrative embodiment of the invention.

FIG. 3 is a schematic flow-chart of a method 300 of mitigating interference for a wireless communication device in accordance with a demonstrative embodiment of the invention Operations of the method may be used, for example, by system 100, AP 110 and/or STA 120 of FIG. 1, by system 200, Tx device 210 and/or Rx device 220 of FIG. 2, and/or by other suitable units, devices and/or systems.

As indicated at block 310, the method may include estimating the interference level at the transmitting and receiving devices. For example, the interferer energy level may be reported from the "spectrum sensing" unit, e.g., spectrum sensor 127 of station 120 in FIG. 1.

As indicated at block 320, the stations of the wireless link, e.g., devices 210 and 220 of FIG. 2 or AP 110 and STA 120 of FIG. 1, may compare the sensed interferer energy with two sensitivity thresholds: the clear-channel threshold, denoted CCA, and the noise-tolerability threshold, denoted T. If the interferer energy level is above T, it may indicate that the interference will destroy packet reception at that station, that is, that the interferer energy cannot be tolerated. The opposite may be true when interference is below T, namely, that the interference is at a tolerable level.

In some embodiments, the noise-tolerability threshold value T may be a pre-set value, or may be dynamically changed based on the received signal from the intended station. For example, based on the received signal "S" from AP 110, station 120 may change T based on some criteria, for example, S/T>=10 dB or other suitable value.

There are three possible cases of how the interferer energy compares to the two sensitivity thresholds, and these three cases correspond to the three interference categories described in FIG. 1 and summarized in Table 1. The station may then use two bits to represent the case number, for example, as shown in Table 1. It is noted that the term "above T?" in Table 1 corresponds to the term "corrupt packet?" in Table 2.

As indicated at block 330, the method may include sending interference strength feedback to the intended communicating station, for example, using a two-bit representation of the interference category. The two bits can be relayed as a new information element (IE), or may use unreserved bits in IEEE 802.11 MAC management messages. For example, IEEE 802.11v includes a mechanism to handle non-IEEE 802.11 interference, and the two bits information may be in accordance with IEEE 802.11v.

As indicated at block 340, the method may include evaluating which one, of the nine possible cases, matches the location of the interferer with respect to the wireless link. For example, the transmitting device may categorize the interference location relative to the wireless link based on the interference strength feedback from the receiving device, combined with the interference strength classification at the transmitter.

As indicated at block 350, the method may include mitigating any interference effects, as necessary, based on the evaluation of interfere location relative to the wireless link.

For example, in some embodiments the transmitting device may decide whether and what actions need to be taken, as follows:

As indicated at block 354, in cases where the interferer energy level at the transmitter is below the clear-channel threshold (case I) and the interferer energy level at the receiver is above the noise-tolerability threshold (case III), one or more algorithms to mitigate the interferer effect for case 283 may be used.

As indicated at block 355, in cases where the interferer energy level at the transmitter is between the clear-channel threshold and the noise-tolerability threshold (case II) and the interferer energy level at the receiver is below the noise-tolerability threshold (case II or case III), increasing the CCA threshold at the transmitter to be above the interferer energy level may assist the transmitter to be more aggressive in transmissions.

In some embodiments, such CCA threshold adaptation is set according to the energy level of the specific interferer and is not based on a long-term metric such as PER (packet error rate). Furthermore, the leveling of the CCA threshold may be temporary or may last longer, depending on which interferer is being handled. For example, to mitigate a microwave interferer, the setting is expected to be effective only for several minutes, while the setting for a cordless phone may be longer.

As indicated at block 356, in other cases, for example, cases 281, 282, and 285-289, no mitigating action may be necessary, and interference mitigation algorithms or components may be disabled, deactivated, or otherwise paused.

Other suitable operations may be used, and other suitable orders of operation may be used. One or more operations may be repeated, for example, for a pre-defined time period, for a pre-defined number of iterations, substantially continuously, at pre-defined time intervals, until a pre-defined condition holds true, or based on other criteria.

In some embodiments, for example, in order to effectively and accurately mitigate the effect of non-IEEE 802.11 interference, a WLAN device may determine the cause of the performance degradation and take corresponding actions. This may be performed using a protocol and mechanism for a WLAN station to estimate how an interferer is located relative to current WLAN link (for example, out of nine possible cases, as discussed). A mitigation scheme allows the station to mitigate the interference effect. Some embodiments thus classify how an interferer is located relative to a WLAN link. Based on such information, accurate and effective actions can be taken to mitigate the effect of the interference.

In some embodiments, the IEEE 802.11 device is able to evaluate how an interferer is relative located to the WLAN link, and then corresponding actions can be taken to improve the link performance significantly. Some embodiments can be used in environments where non-IEEE 802.11 interference has been regarded as difficult to deal with, such as an enterprise environment or a digital home environment.

Optionally, performance of a method in accordance with some embodiments may be detected by placing an interferer to a WLAN link according to different cases, examining the encoded IE, and/or monitoring the behavior of the transmitter (e.g., whether or not transmissions are adjusted based on interferer location).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

In some embodiments, the method described herein may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, for example, an application-specific integrated circuit (ASIC) or a field-programmable gate array (FPGA), or by any combination of programmed computer components and custom hardware components. Various general-purpose systems may be used with programs in accordance with the teachings herein, or it may prove convenient to construct a more specialized apparatus to perform the method.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of mitigating interference in a wireless network, the method comprising:
    comparing an energy level of an interferer with a clear-channel threshold value and a noise-tolerability threshold value of a wireless communication device;
    classifying a location of said interferer relative to said wireless communication device into one selected interference category of three interference categories, wherein a first interference category includes energy below said clear-channel threshold and below said noise-tolerability threshold, wherein a second interference category includes energy above said clear-channel threshold and below said noise-tolerability threshold, and wherein a third interference category includes energy above said clear-channel threshold and above said noise-tolerability threshold; and
    categorizing the location of said interferer relative to a wireless link between said wireless communication device and another wireless communication device, based on a combination of the selected interference category for said wireless communication device and an interference category for said other wireless communication device.

2. The method according to claim 1, comprising mitigating interference to said wireless link based on the categorization of said interferer location.

3. The method according to claim 2, wherein said interferer location is categorized in the second interference category for the wireless communication device and in either the first or the second interference category for the other wireless communication device, and wherein mitigating comprises adapting the noise-tolerability threshold of said wireless communication device to allow transmission.

4. The method according to claim 3, wherein adapting the noise-tolerability threshold comprises setting the noise-tolerability threshold value according to the energy level of said interferer.

5. The method according to claim 3, wherein adapting the noise-tolerability threshold comprises setting a duration for the adapting according to an operating parameter of said interferer.

6. The method according to claim 1, comprising providing as feedback to said other wireless communication device a two-bit representation of the interference category of said interferer for said wireless communication device.

7. An apparatus for mitigating interference in a wireless network, the apparatus comprising:
    a wireless communication device having a transceiver able to classify a location of an interferer relative to said wireless communication device into one selected interference category of three interference categories by comparing an energy level of the interferer with a clear-channel threshold value and a noise-tolerability threshold value of said wireless communication device,
    wherein said transceiver is able to categorize the location of said interferer relative to a wireless link between said wireless communication device and another wireless communication device, based on a combination of the selected interference category for said wireless communication device and an interference category received from the other wireless communication device.

8. The apparatus according to claim 7, wherein a first interference category includes energy below said clear-channel threshold and below said noise-tolerability threshold, wherein a second interference category includes energy above said clear-channel threshold and below said noise-tolerability threshold, and wherein a third interference category includes energy above said clear-channel threshold and above said noise-tolerability threshold.

9. The apparatus according to claim 8, wherein said transceiver is able to receive as feedback a two-bit representation of the interference category of said interferer for the other wireless communication device.

10. The apparatus according to claim 7, wherein said transceiver is able to mitigate interference to said wireless link according to the categorization of said interferer location.

11. The apparatus according to claim 10, wherein said transceiver is able to adapt the noise-tolerability threshold of said wireless communication device to allow transmission if said interferer location is categorized in the second interference category for said wireless communication device and in either the first or the second interference category for the other wireless communication device.

12. The apparatus according to claim 11, wherein said transceiver is able to set the noise-tolerability threshold value of said wireless communication device according to the energy level of said interferer.

13. The apparatus according to claim 11, wherein said transceiver is able to set a duration for adapting the noise-tolerability threshold according to an operating parameter of said interferer.

14. The apparatus according to claim 7, wherein said wireless communication device is operatively coupled to a radio frequency antenna to allow communication via said wireless link.

15. The apparatus according to claim 7, wherein said wireless communication device is able to operate according to an IEEE 802.11 communication standard.

* * * * *